United States Patent [19]

Hoffman et al.

[11] Patent Number: 4,707,529
[45] Date of Patent: Nov. 17, 1987

[54] POLY(SILOXANE)-MODIFIED EPOXY RESINS

[75] Inventors: Dwight K. Hoffman; Reet T. Fernandez, both of Midland, Mich.

[73] Assignee: The Dow Chemical Company, Midland, Mich.

[21] Appl. No.: 749,249

[22] Filed: Jun. 27, 1985

[51] Int. Cl.$^4$ .................... C08L 63/00; C08F 283/10
[52] U.S. Cl. .................................. 525/476; 525/103; 525/529; 525/479; 528/27; 528/26
[58] Field of Search ...................... 525/476, 529, 103; 528/27

[56] References Cited

U.S. PATENT DOCUMENTS

| | | | |
|---|---|---|---|
| 3,154,597 | 10/1964 | McWhorter | 525/476 |
| 3,170,962 | 2/1965 | Tyler | 525/476 |
| 3,317,443 | 5/1967 | Brady | 525/476 |
| 3,577,263 | 5/1971 | Nordstrom | 525/476 |
| 3,842,141 | 10/1974 | Fetscher et al. | 525/476 |
| 3,843,577 | 10/1974 | Keil | 525/476 |

Primary Examiner—Wilbert J. Briggs, Sr.

[57] ABSTRACT

Dispersions of siloxane polymers and optional dispersion stabilizers in a polyepoxide resin continuous phase are characterized in that the siloxane polymer is grafted to the polyepoxide resin, and the dispersions remain stable. The compositions are curable and are useful as coatings, in preparing laminates and reinforced plastics, and as adhesives.

18 Claims, No Drawings

POLY(SILOXANE)-MODIFIED EPOXY RESINS

BACKGROUND OF THE INVENTION

The present invention relates to polyepoxide compositions, and in particular, to those polyepoxide compositions which contain grafted siloxane polymers dispersed therein.

Epoxy resins have a spectrum of properties that are well adapted for use in coatings, adhesives, fiber reinforced laminates, composites, engineering plastics, and specialty applications, such as potting resins and mortars. Among those properties are corrosion and solvent resistance, good adhesion and electrical properties, good dimensional stability, hardness, low shrinkage on cure and many other beneficial properties.

Unfortunately, a major disadvantage of epoxy resins concerns an undesirable brittleness. A partial solution to such a problem has been the addition of reactive liquid polymers (RLP). These RLP's are generally elastomers, such as carboxyl-terminated butadiene-acrylonitrile copolymers, which precipitate out of solution during cure of the polyepoxide. The precipitation results in the formation of discrete elastomer particles or domains which toughen the resin. Although toughening the cured resin, such a technique results in a significantly lowered softening temperature. Particle size is a major factor which determines the mechanical properties. The selectivity and reactivity of the functional groups are critical in the formation of the particles. Also, the curing conditions seriously affect their size and structure. Another disadvantage is that the RLP is limited to low molecular weights for good mixing and low viscosity. Yet another disadvantage involves the relatively poor thermal and oxidative stability of polymers comprising polymerized monomers such as butadiene.

Curable epoxy resin compositions containing acrylate rubbers are disclosed in European Patent Application No. 78527. For example, the reference discloses polyepoxides containing rubbers prepared from butyl acrylate. Unfortunately, said rubbers are soluble in the polyepoxide continuous phase at temperatures above about 51° C., and in some instances at room temperature. Thus, undesirable softening of the cured resin can readily occur. In addition, it is difficult to control particle size of the dispersed phase polymerizate because dissolving and reprecipitation of said polymerizate is difficult to control. Control of parameters such as particle size of the polymerizate are critical in optimizing mechanical properties of the composition.

Curable blends of epoxy resins and organopolysiloxanes are disclosed in U.S. Pat. Nos. 3,843,577 and 3,926,885. Such epoxy resin composites are disclosed as being dispersions of organopolysiloxanes in an epoxy resin continuous phase. Dispersing agents are employed in preparing such composites. Although the composites are disclosed as having self-lubricating properties, the mechanical properties of such composites are not as great as would be desirable.

It would be highly desirable to provide a process for significantly improving the toughness of epoxy resins without sacrificing the other properties which would extend the utility of said resins. It would be particularly desirable to provide a control over dispersed particle size, to provide dispersed particles which are highly incompatible with the continuous epoxy phase and to provide a product having high heat distortion temperatures in the cured form. In addition, it would be desirable to provide a more processable polymer-modified epoxy resin (i.e., lower viscosity than that exhibited by RLP modified resins).

Thus, in view of the deficiencies of the prior art, it would be highly desirable to provide a stable dispersion of a polymer in an epoxy compound, wherein the dispersed polymer phase does not interfere with the desirable properties of the epoxy compound; and which dispersion when cured exhibits (1) a desirably high glass transition temperature; and (2) a good toughness, as provided by a dispersed polymer phase.

SUMMARY OF THE INVENTION

The present invention is a dispersion of a siloxane polymer and optional dispersion stabilizer in an epoxy compound as a continuous phase, wherein said siloxane polymer is grafted to said epoxide compound. For purposes of this invention, the dispersion stabilizer is also called a dispersant or dispersing agent.

The present invention in yet another aspect is a process for preparing the aforementioned stable dispersion of a siloxane polymer in an epoxy compound continuous phase, which process comprises (1) providing an epoxy compound adduct by reacting a minor amount of a functional monomer with an epoxy compound continuous phase (2) providing a stabilized dispersion by reacting the adduct with a siloxane polymer comprising a functionality capable of reacting with the functionality of the adduct in the epoxy compound continuous phase. Optionally, a silicone surfactant can be provided in the aforementioned process step (2).

As used herein the term "stable" is meant to refer to dispersions which remain substantially constant (i.e., do not undergo substantial reprecipitation or redispersion) under conditions of preparation as well as conditions of thermal cure. For example, the dispersion of polymer remains stable (e.g., insoluble) under normal preparation, handling and processing (e.g., curing) conditions by maintaining a substantially constant particle morphology (e.g., size and distribution) in the continuous phase at some temperature, normally above 60° C. Stable dispersions are, for example, those dispersions in which the siloxane polymer dispersed phase is insoluble in the continuous phase and which phases do not readily separate into layers. Insolubility can be qualitatively identified by a cloudiness of the composition to visible observation.

Siloxane polymer particles of the dispersed phase exhibit high flexibility, high weatherability, good thermal stability, oxidative stability and hydrolytic stability. The relatively low glass transition temperatures of the siloxane polymers provides the skilled artisan with a means for providing epoxy resin compositions having effective mechanical property control over a broad temperature range and particularly at low temperatures. Stability of the dispersions of this invention is believed to be due, at least in part, to the grafting of the siloxane polymer to the epoxy compound.

Stable dispersions of this invention find a wide variety of uses in numerous applications. For example, stable dispersions are used as coatings (e.g., solution, high solids or powder coatings); fiber-reinforced laminates; advanced composites including aerospace, fiberglass reinforced plastics; tooling, casting and molding resins; bonding agents and adhesives agents in flooring, paving and exposed aggregate applications; and the like.

DETAILED DESCRIPTION OF THE INVENTION

Epoxy compounds useful in this invention include a wide variety of epoxy compounds. Typically, the epoxy compounds are epoxy resins which are also referred to as polyepoxides. Polyepoxides useful herein can be monomeric (e.g., the diglycidyl ether of bisphenol A), higher molecular weight advanced resins or polymerized unsaturated monoepoxides (e.g., glycidyl acrylate, glycidyl methacrylate, allyl glycidyl ether, etc.) to homopolymers or copolymers. Most desirably, epoxy compounds contain, on the average, at least one pendant or terminal 1,2-epoxy group (i.e., vicinal epoxy group) per molecule.

Examples of useful polyepoxides include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, epoxidized polyolefins, epoxidized diunsaturated acid esters, epoxidized unsaturated polyesters, and mixtures thereof. Numerous polyepoxides prepared from polyhydric phenols include those which are disclosed, for example, in U.S. Pat. No. 4,431,782. Polyepoxides can be prepared from mono-, di- and trihydric phenols, and can include the novolac resins. Polyepoxides can include the epoxidized cycloolefins; as well as the polymeric polyepoxides which are polymers and copolymers of glycidyl acrylate, glycidyl methacrylate and allylglycidyl ether. Suitable polyepoxides are disclosed in U.S. Pat. Nos. 3,804,735; 3,892,819; 3,948,698; 4,014,771 and 4,119,609; and Lee and Neville, *Handbook of Epoxy Resins*, Chapter 2, McGraw Hill, New York (1967).

While the invention is applicable to polyepoxides, generally preferred polyepoxides are glycidyl polyethers of polyhydric alcohols or polyhydric phenols having weights per epoxide group of 150 to 2,000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

The polyepoxide may also include a minor amount of a monoepoxide, such as butyl glycidyl ether, phenyl glycidyl ether, or cresyl glycidyl ether, as a reactive diluent. Such reactive diluents are commonly added to polyepoxide formulations to reduce the working viscosity thereof, and to give better wetting to the formulation. As is known in the art, a monoepoxide affects the stoichiometry of the polyepoxide formulation and adjustments are made in the amount of curing agent and other parameters to reflect that change.

Siloxane polymers of this invention are characterized as having functional groups capable of forming a graft with the epoxy compound continuous phase. Preferred functional groups include vinyl polymerizable moieties, and typical polymers include vinyl terminated polydimethylsiloxane; vinylmethyl and dimethylpolysiloxane copolymers; methacryloxypropylmethyl and dimethylpolysiloxane copolymers; the so-called T-structure polydimethylsiloxanes having vinyl functionality(ies) at branchpoint(s), which polymers include a T-structure vinyl polydimethylsiloxane or a T-structure methacryloxypropyl polydimethylsiloxane; polymethyl(phenethylsiloxanes) which are vinyldimethylsiloxy terminated; dimethyldiphenyl polysiloxane copolymers which are vinyl terminated; and the like. If, on the average, more than one functionality per siloxane polymer is present, crosslinking which provides further toughness to the epoxy resin can occur.

The preparation of the aforementioned epoxy resin adduct involves employing a functional monomer having a group reactive with an epoxy group in addition to another reactive functionality (e.g., a polymerizable vinyl functionality). Reactive functional monomers useful in the grafting reaction of this invention can be described as those monomers having a functionality capable of undergoing a polymerization reaction with the functionalities of the siloxane polymers forming the dispersed phase (e.g., a vinyl functionality) and a functionality capable of reacting or coupling with a reactive moiety of an epoxy compound (e.g., an epoxy functionality). The reaction product of a reactive functional monomer and an epoxy resin to form a new product having vinyl unsaturation can be called a vinylized adduct. Vinylized adducts are typically prepared by reacting an oxirane moiety of a polyepoxide with an ethylenically unsaturated functional monomer such as those described hereinafter. This functionalized monomer can be incorporated in a minor amount in the epoxy compound and functionalized siloxane polymer mixture in an amount sufficient to provide grafting of the dispersed polysiloxane polymers in the epoxy compound continuous phase when the composition is cured. Illustrative of functional monomers are acrylic acid, methacrylic acid, crotonic acid, itaconic acid, 2-hydroxyethyl or propylacrylate, 2-hydroxyethyl methacrylate, t-butylaminoethyl methacrylate, β-isocyanatoethyl methacrylate, glycidyl acrylate, glycidyl methacrylate, glycol monoesters of itaconic acid, methyl monoester of itaconic acid, acrylamide or substituted acrylamides, allyl alcohol, maleic acid, fumaric acid, isopropenyl phenol, and the like.

The reactivity of functional groups, process conditions for reaction and other reaction parameters are disclosed in Lee and Neville, *Handbook of Epoxy Resins*, McGraw Hill, New York (1967) at Appendix 5-1 and the in Chapter 5, pages 39-40. Catalysts useful in preparing vinylized adducts from, for example, polyepoxides and unsaturated carboxylic acids, include the ethyl triphenyl phosphonium acetate acetic acid complex and other onium compounds; tertiary amines such as tris(-dimethylaminoethyl) phenol; triphenyl phosphine; metal salts such as chromium chloride and chromium acetate; and other catalysts which catalyze the epoxy/-carboxy reaction. If desired, it is possible to incorporate a polymerization inhibitor into the reaction mixture in order to prevent premature vinyl polymerization of the ethylenically unsaturated moieties prior to the completion of the epoxy/carboxy reaction. Examples of such inhibitors include 2,6-di-tertiary-butyl4-methylphenol, p-methoxyphenol, hydroquinone and tetrahydrothiazine. Such inhibitors can be additionally employed for improved storage of the reactive functional monomer.

The grafting reaction is induced and maintained by conventional free radical catalysts and elevated temperatures. The concentration of the catalyst can vary from about 0.001 to about 10 percent, preferably from about 0.2 to about 1.0 percent; however, any effective catalytic amount is satisfactory. Illustrative catalysts are the well-known free radical type of vinyl polymerization catalysts, for example, the peroxides, persulfates, perborates, percarbonates, peresters, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)-peroxide, p-monomethoxybenzoyl peroxide, rubrene peroxide, ascaridol, t-butyl peroxybenzoate, t-butyl peroxyacetate, t-amyl peroxyacetate, di-t-butyl diperoxyazelate, di-t-amyl diperoxyazelate, di-t-butyl diperoxyphthalate, di-t-amyl diperoxyphthalate, t-butyl peroxy-2-ethylhexanote, t-amyl peroxy- -2-ethylhexanote, t-butyl peroxyisobutyrate, t-amyl peroxyisobutyrate, t-butyl peroxymaleic acid, t-amyl peroxymaleic acid, t-butyl peroxyneodecanoate, t-amyl peroxyneodecanoate, α-cumyl peroxyneodecanoate, α-cumyl peroxypivalate, diethyl peroxyterephthalate, propyl hydroperoxide, isopropyl hydroperoxide, n-butyl hydroperoxide, t-butyl hydroperoxide, cyclohexyl hydroperoxide, trans-decahydronaphthalene hydroperoxide, α-hydroperoxide, α-methyl-α-ethyl benzyl hydroperoxide, tetrahydronaphthalene hydroperoxide, triphenylmethyl hydroperoxide, diphenylmethyl hydroperoxide, α,α'-azo-2-methyl butyronitrile, α,α'-2-methyl heptonitrile, 1,1'-azo-1-cyclohexane carbonitrile, dimethylα,α'-azo-isobutyrate, 4, 4'-azo-4-cyanopentanoic acid, azobisisobutyronitrile, 2,2'-azobis(2,4-dimethyl-4-methoxyvaleronitrile), 2,2'-azobis(dimethylvaleronitrile), persuccinic acid, diisopropyl peroxy dicarbonate, and the like; a mixture of catalysts may also be used.

Dispersion stabilizers (also known as dispersing agents) are employed in the process of this invention in order to prepare a dispersion more easily and also to provide dispersions having superior stability. A dispersion stabilizer is any molecule which contains at least two different segments, one of which is compatible with the polyepoxide and one of which is compatible with the polymer particles of the dispersed phase. See, for example, *Dispersion Polymerization in Organic Media*, edited by K. E. J. Barrett, John Wiley and Sons, London (1975). Suitable dispersing agents are disclosed in U.S. Pat. Nos. 3,843,577 and 3,926,885.

The dispersion of siloxane polymer in the epoxy compound can be prepared using a variety of techniques. For example, a modified epoxy resin can be prepared in situ by reacting a functional monomer (e.g., acrylic acid) with the epoxy compound in the presence of a suitable catalyst. The resulting epoxy compound having reactive functional groups (e.g., ethylenically unsaturated moieties) can be further reacted with the functionalized siloxane polymer in order to form the dispersed phase. Alternatively, for example, the dispersion of siloxane polymer in the epoxy compound can be prepared separately by adding a silicone surfactant. The epoxy resin can then be functionalized and the grafting reaction run. Such processes provide a means for the skilled artisan to prepare stable dispersions of a siloxane polymer in a polyepoxide continuous phase, in which the polymers are dispersed as particles before curing.

Stable dispersions of siloxane polymers in the epoxide compound are those dispersions which remain stable at a temperature above 60° C., preferably above about 90° C. For example, the polymer which forms the stable dispersed phase is one which is insoluble in the epoxide compound continuous phase at some temperature above 60° C., preferably at some temperature above about 90° C. Thus, for purposes of this invention the term "good stability" in referring to the dispersions of this invention can mean that (a) the particles do not coagulate or coalesce to an appreciable degree prior to use or during the curing process; (b) the particles have a controlled particle size; (c) the dispersions can be stored for reasonable periods without premature curing; and (d) the particles maintain a size and dispersion distribution which remains substantially unchanged during storing and processing.

Because this invention concerns stable dispersions of siloxane polymers in an epoxide compound (e.g., polyepoxide) continuous phase, it is understood that the stability of the dispersion depends upon the appropriate combination of siloxane polymer and epoxy resin. If the polymer which forms the desired dispersed phase in the polyepoxide, forms an unstable dispersion, it is possible that the desired results can be obtained with the same polymer in a different polyepoxide. The stability can be improved in order to provide a dispersion which remains stable in the polyepoxide as per the definition of this invention by employing a particular polyepoxide, a particular dispersed phase siloxane polymer, a combination of a particular polyepoxide and a particular dispersed phase siloxane polymer and optional dispersion stabilizer.

Numerous factors affect the stability or insolubility of the dispersed polymer in the polyepoxide continuous phase. For example, polyepoxides having greater viscosities provide greater stability to the polymers of the dispersed phase. Dispersed polymer particles of smaller particle size generally have greater stability than larger size particles. A small difference in density between the dispersed and continuous phases generally provides a composition having greater dispersion stability than a composition having a large difference in density between the components of the aforementioned phases. Particles having less tendency to agglomerate provide compositions which have greater stability than those compositions which contain components which have a greater tendency to agglomerate. Thus, by altering the types of componens which are employed in preparing the composition of this invention, it is possible to control factors such as the coagulation or coalescence of the dispersed phase in the continuous phase. It is understood that the presence of a dispersion stabilizer or the absence of undesirable flocculants in the composition can also control the amount of undesirable coagulation or coalescence of the dispersed phase in the continuous phase.

The dispersed phase can be in an amount of from about 1 to about 70 volume percent, preferably about 5 to about 50 percent of the total dispersion. The optimum concentration of polymeric dispersed phase can and will be varied depending upon the materials employed and the end use that is envisaged. The dispersions are usually made at a solids level at which the dispersions are to be used. However, it is possible to prepare higher solids dispersions and dilute to the final solids level. The dispersion stabilizer (i.e., dispersing agent) can be employed in an amount which typically ranges from 0 to about 70 volume percent based on the volume of the siloxane polymer of the dispersed phase. When employed, the dispersion stabilizer is advantageously employed in an amount ranging from about 5 to about 30 volume percent based on the volume of the siloxane polymer of the dispersed phase.

The properties of the dispersion are influenced by a variety of factors including the identity of the components, the particle size and concentration of the disperse phase, the hardness or softness of the particles of the disperse phase, the concentration of the dispersion stabilizer and many other factors. For many applications it is most desirable to employ a dispersed phase polymer having a solution temperature above the curing temperature of the polyepoxide.

For most practical applications, the stability of the dispersion and the property enhancement due to the dispersed phase will be optimized with particles that are less than some critical particle size which is about 20 microns.

The dispersions are solidified by curing the polyepoxide. In the curing of polyepoxides the choice of curing agent can influence the cure rate, the exotherm and resultant properties of the finished product. Curing agents and their influence are known in the literature as, for example, in the book, *Handbook of Epoxy Resins*, (supra) and in *Chemical Reactions of Polymers*, Interscience Publishers, New York, pages 912–926, (1967) and in other reference works. Some of these influences are illustrated in *Modern Plastics Encyclopedia*, pages 33–34, (1982–1983).

The cured products have improved toughness over those without the dispersed phase. Also, the heat distortion temperatures are improved over those exhibited the products obtained by curing a polyepoxide containing dissolved carboxylated rubbers as, for example, carboxyl-terminated diene elastomers or amine-terminated butadiene acrylonitrile.

The properties of the cured products are also influenced by the hardness of the dispersed polymer. As a general rule, the best performance is obtained with siloxane polymer particles having glass transition temperatures below room temperature.

The compositions of this invention are useful in all applications in which epoxy resins are useful. The compositions are especially well adapted for a variety of high performance, engineering plastic applications in which one or more of the physical properties of polyepoxides has been a limiting factor. An additional application is encapsulation of electrical components which are exposed to wide temperature fluctuations. For example, the compositions of this invention can exhibit improved toughness and can maintain hardness at high application temperatures. Another application is coating resins.

The following examples are presented to further illustrate but not limit the scope of this invention. All parts and percentages are by weight unless otherwise indicated.

EXAMPLE 1

A stable dispersion of grafted silicone particles in an epoxy resin is prepared as follows: Into a reaction vessel which is equipped with an addition funnel, stirrer, condenser, thermocouple, and nitrogen sparge is charged 1,200 grams (g) of a diglycidyl ether of bisphenol A having an epoxide equivalent weight of from 178 to 186 and a viscosity at 25° C. of between 9,000 and 11,500 centipoise and sold commercially as D.E.R. ® 383 epoxy resin by The Dow Chemical Company. The epoxy resin is heated to 100° C. with stirring. To the heated resin is charged 10 g methacrylic acid. After mixing, 0.5 g of a catalyst, which is 70 percent ethyltriphenylphosphonium acetate acetic acid complex in methanol (phosphonium catalyst), is added. The resulting mixture is stirred at about 100° C. for 1 hour.

The reaction vessel is flushed with nitrogen. To the reaction vessel is added under nitrogen sparge, at 85° C. and with stirring, a mixture of 300 g of a poly(vinylmethyl-co-dimethylsiloxane) having 1 percent random vinyl methyl groups and having a viscosity of 1,000 centistokes and which is sold commercially as PS 426 by Petrarch Systems, Incorporated, and 3.8 g of t-butylperoctoate catalyst. The reaction mixture is held at 85° C. for 4 hours after addition of the vinylized polydimethylsiloxane is complete while nitrogen sparge and stirring is continued. The remaining, if any, volatile materials are removed from the mixture by vacuum distillation at 120° C. The product is a viscous dispersion of grafted polysiloxane particles in an uncured epoxy resin.

The product is cured and cast as follows. The product is heated to 70° C. and is contacted with a stoichiometric amount of triethylenetetramine curing agent. The mixture is stirred and poured into a mold which has been preheated to 70° C. The mold comprises two smooth metal plates separated by a silicone rubber gasket and pretreated with a tetrafluoroethylene dry lubricant. The mold containing the mixture to be cured is allowed to stand overnight at room temperature. The mold is postcured at 125° C. for 1 hour, at 150° C. for another hour, and is slowly cooled at about 1° C./minute or less until the temperature reaches about 20° C. The casting is removed from the mold and is designated as Sample No. 1.

For comparison purposes is prepared Sample No. C-1 which is the previously described epoxy resin not containing a dispersed phase polysiloxane, and which is cast as previously described.

For comparison purposes are prepared Sample Nos. C-2 and C-3, which are dispersions comprising 20 percent polydimethylsiloxane in 80 percent of the previously described epoxy resin and 10 percent (based on polydimethylsiloxane) of a silicone polyalkyleneoxide surfactant, which is sold commercially as Dow Corning DC-190. The samples are prepared using the general teachings of U.S. Pat. Nos. 3,843,577 and 3,926,885. The comparative samples are cast as previously described.

For comparison purposes is prepared Sample No. C-4, which is a dispersion of the polysiloxane of Sample No. 1 in the previously described epoxy resin and prepared as described for Sample Nos. C-2 and C-3. The comparative sample was cast as previously described.

The physical properties of each casting are determined as follows. The glass transition temperature ($T_g$) is measured by dynamic modulus at 0.1 Hz, performed on Rheometrics Mechanical Spectrometer Model RMS605 and is presented in ° C. The fracture energy ($G_{1c}$) is measured using a double edge notch technique as defined in "Plane Strain Crack Toughness Testing of High Strength Metallic Materials", by W. F. Brown, Jr. and by J. E. Sprawley in *ASTM Special Technical Bulletin* #410, ASTM, Philadelphia, PA (1969); and is presented in KJ/m$^2$ Data concerning the physical properties of the various castings are presented in Table I.

TABLE I

| Sample No. | Siloxane Polymer Viscosity (Centistokes) | Casting $G_{1c}$ | Casting $T_g$ |
|---|---|---|---|
| 1 | 1,000 | 1.08 | 131 |
| C-1* | — | 0.52 | 128 |
| C-2* | 1,000 | 0.64 | 129 |
| C-3* | 100,000 | 0.64 | 126 |
| C-4* | 1,000 | 0.51 | 124 |

*Not an example of the invention.

TABLE II

| Sample No. | Siloxane Polymer Viscosity (Centistokes) | Casting $G_{1c}$ | Casting $T_g$ |
|---|---|---|---|
| 3 | 100,000 | 1.25 | 114 |
| C-3* | 100,000 | 0.64 | 126 |
| C-5* | 100,000 | 0.68 | 123 |

EXAMPLE 2

In a similar manner as described in Example 1, a stable of grafted silicone particles in epoxy resin is prepared. Into a reaction vessel, as previously described, is charged 1,200 g D.E.R. ® 383 liquid epoxy resin. The epoxy resin is heated to 100° C. with stirring and 10 g of methacrylic acid is added. To the resulting mixture is charged 0.5 g of a phosphonium catalyst. The resulting mixture is stirred at about 100° C. for 1 hour.

Into the modified epoxy resin is mixed 30 g of a silicone polyalkylene oxide surfactant, which is sold commercially as Dow Corning DC-190. The reaction vessel is flushed with nitrogen and heated to 85° C. To the reaction vessel is added 300 g of a 1 percent random vinyl methyl polydimethylsiloxane (PS 426 by Petrarch Systems, Inc.) and 3 g of an azo initiator, which is sold commerically by E. I. duPont de Nemours, Inc. as Vazo 67 initiator. While the nitrogen sparge is continued, the reaction mixture is held at 85° C. for 4 hours. The remaining, if any, volatile materials are removed from the mixture by vacuum distillation at 120° C. The product is a viscous dispersion of grafted polysiloxane particle in an uncured epoxy resin.

The product is cured and cast as previously described. The $G_{1c}$ of the casting is 0.96 KJ/m² and the $T_g$ is 122° C.

EXAMPLE 3

An epoxy resin modified with crotonic acid and grafted to vinyl-functionalized silicone oil is prepared as follows: Into a two liter, three-necked round-bottomed flash equipped with a stirrer, condenser, addition funnel, thermocouple and nitrogen sparge is charged 1,200 g of the liquid epoxy resin of Example 1. The epoxy resin is heated to 100° C. under an air blanket and 10 g crotonic acid followed by 0.5 g of a phosphonium catalyst are added while stirring. The reaction temperature is held at 100° C. until the esterification reaction is complete to greater than 90 percent in about 2 hours as monitored by titration with standardized base. The vinylized epoxy resin is cooled to 80° C. and under a nitrogen sparge is added 300 g of a vinyl dimethyl-terminated polydimethylsiloxane, which is obtained from Petrarch Systems, Inc., and sold as PS 448, 30 g Dow Corning DC 190 silicone surfactant and 3 g benzoyl peroxide. The reaction temperature is held at 80° C. for an additional 4 hours. Then the product is stripped of volatiles under vacuum at 120° C. The final product is a grafted silicone oil-modified epoxy resin dispersion.

The product is cured and cast as previously described. For comparison purposes is prepared Sample No. C-5 which is a dispersion of the polysiloxane of Sample No. 3 in the previously described epoxy resin and prepared as described for Sample Nos. C-2 and C-3. The comparative sample was cast as previously described. The results are shown in Table II.

EXAMPLE 4

In a similar manner as described in Example 1, a stable dispersion of grafted silicone particles in epoxy resin is prepared. Into a reaction vessel, as described in Example 3, is charged 950 g of the previously described epoxy resin. The epoxy resin is heated to 100° C. under an air blanket and 5 g methacrylic acid followed by 0.25 g phosphonium catalyst is added with stirring. The reaction temperature is held at 100° C. for 1 hour and then raised to 1200° C. Then 50 g of a T-structure methacryloxypropyl polydimethylsiloxane, sold commercially by Petrarch Systems as PS 406, 5 g of DC-190 silicone surfactant and 1.5 g t-butyl perbenzoate are added. The temperature is held at 120° C. for 4 hours. The remaining, if any, volatile materials are removed from the mixture by vacuum distillation at 120° C. The product is a viscous dispersion of grafted polysiloxane particles in an uncured epoxy resin.

The product is cured and cast as previously described. The $G_{1c}$ of the casting is 1.53 KJ/m² and the $T_g$ is 126° C.

What is claimed is:

1. A dispersion which comprises an uncured epoxy compound as a continuous phase having dispersed therein and grafted thereto an insoluble siloxane polymer, which dispersion is formed by contacting at elevated temperature (1) a functionalized, uncured epoxy compound adduct which is the reaction product of an uncured epoxy compound and a minor amount of a functional monomer and (2) a siloxane polymer having a vinyl functionally capable of reacting with the functionality of the adduct, whereby an insoluble dispersion of grafted siloxane polymer in the uncured epoxy compound continuous phase is formed.

2. The dispersion of claim 1 which is characterized in that the dispersion remains stable at least up to a temperature of 60° C.

3. The dispersion of claim 1 wherein said epoxy compound is a liquid polyepoxide.

4. The dispersion of claim 3 wherein said liquid polyepoxide is a diglycidyl ether of bixphenol A.

5. The dispersion of claim 1 wherein said epoxy compound is a solid polyepoxide.

6. The dispersion of claim 1 wherein said epoxy compound is a halogenated polyepoxide.

7. The dispersion of claim 6 wherein said halogenated polyepoxide is a polyglycidyl ether of brominated bisphenol A.

8. The dispersion of claim 1 wherein said epoxy compound is an epoxy novolac.

9. The dispersion of claim 1 wherein said epoxy compound is tris(glycidylphenyl)methane.

10. The disperson of claim 1 wherein said epoxy compound is tetraglycidyl ether of methylene dianiline.

11. The dispersion of claim 1 additionally containing a dispersion stabilizer.

12. The dispersion of claim 1 wherein said siloxane polymer is a vinyl terminated polydimethyl-siloxane, a vinylmethyl and dimethyl polysiloxane copolymer, a methacryloxypropylmethyl and dimethyl polysiloxane copolymer, a polymethyl(phenethylsiloxane) which is vinyldimethylsiloxy terminated, a vinyl terminated dimethyldiphenyl polysiloxane copolymer, a T-structure vinyl polydimethylsiloxane or a T-structure methacryloxypropyl polydimethylsiloxane.

13. A process of preparing a dispersion of an insoluble siloxane compound in an epoxy compound continuous phase which comprises contacting (1) a functionalized, uncured epoxy compound adduct which is the reaction product of an uncured epoxy compound and a minor amount of a functional monomer and (2) a siloxane polymer having a vinyl functionally capable of reacting with the functionally of the adduct, at an elevated temperature for a time sufficient to graft the siloxane polymer to the functionalized epoxy compound whereby an insoluble dispersion of grafted siloxane polymer in the uncured epoxy compound continuous phase is formed.

14. The process of claim 13 wherein said epoxy compound adduct is a reaction product of an unsaturated carboxylic acid and an epoxy compound.

15. The process of claim 13 wherein said epoxy compound adduct is a reaction product of an unsaturated isocyanate and a polyepoxide.

16. The process of claim 13 wherein said epoxy compound adduct is the reaction product of an alkenyl substituted phenol and a polyepoxide.

17. The dispersion of claim 1 wherein the average particle size of the disperse phase is less than 20 microns.

18. The dispersion of claim 1 wherein the dispersed phase is from about 1 to about 70 percent by volume of the dispersion.

* * * * *